（12）United States Patent
Blache et al.

(10) Patent No.: US 9,709,981 B2
(45) Date of Patent: Jul. 18, 2017

(54) MANAGING APPLICATION FAILURES IN A SYSTEM OF DOMESTIC APPLIANCES (75) Inventors: Fabrice Blache, Bernin (FR); Christophe Demottie, Varces Allieres et Risset (FR); Patricia Martigne, Saint Ismier (FR)

(73) Assignee: ORANGE, Paris (FR)

( * ) Notice: Subject to any disclaimer, the term of this patent is extended or adjusted under 35 U.S.C. 154(b) by 300 days.

(21) Appl. No.: 13/807,441

(22) PCT Filed: Jun. 20, 2011

(86) PCT No.: PCT/FR2011/051414
§ 371 (c)(1),
(2), (4) Date: Jan. 29, 2013

(87) PCT Pub. No.: WO2012/001267
PCT Pub. Date: Jan. 5, 2012

(65) Prior Publication Data
US 2013/0187750 A1     Jul. 25, 2013

(30) Foreign Application Priority Data
Jun. 29, 2010  (FR) ..................... 10 55263

(51) Int. Cl.
G05B 23/02    (2006.01)
H04L 12/28    (2006.01)

(52) U.S. Cl.
CPC ...... G05B 23/0259 (2013.01); H04L 12/2827 (2013.01)

(58) Field of Classification Search
CPC ................. G05B 23/0259; H04L 12/2827
(Continued)

(56) References Cited

U.S. PATENT DOCUMENTS 6,891,838 B1 * 5/2005 Petite .................. H04L 12/2825
                                                        340/870.02
6,912,429 B1 * 6/2005 Bilger .................. G08B 25/008
                                                        236/49.3
(Continued)

FOREIGN PATENT DOCUMENTS

EP    1758316 A1    2/2007

OTHER PUBLICATIONS

English Translation of the Written Opinion of the International Searching Authority dated Jan. 8, 2013 for corresponding International Application No. PCT/FR2011/051414, filed Jun. 20, 2011.
(Continued)

*Primary Examiner* — Quan-Zhen Wang
*Assistant Examiner* — Chico A Foxx
(74) *Attorney, Agent, or Firm* — David D. Brush; Westman, Champlin & Koehler, P.A.

(57) ABSTRACT

A method of managing a system provides a minimum service in the system. The system includes a set of pieces of equipment including data-gathering equipment and/or equipment that is to be controlled, the pieces of equipment being connected to a management module via respective first communications links. The management module is suitable for determining a control command as a function of data received from at least one piece of data-gathering equipment via a first communications link and for transmitting the control command to at least one piece of equipment that is to be controlled. The method is adapted to detect an absence of application signaling activity from the management module over a predetermined time period and to trigger a minimum service by sending an alert message to at least one piece of equipment of the system.

17 Claims, 5 Drawing Sheets (58) Field of Classification Search
USPC .............................................. 340/3.44, 10.5
See application file for complete search history.

(56) References Cited

U.S. PATENT DOCUMENTS

| | | | | |
|---|---|---|---|---|
| 7,406,353 | B2* | 7/2008 | Bennett | G05B 19/042 700/14 |
| 7,421,478 | B1* | 9/2008 | Muchow | 709/209 |
| 7,832,465 | B2* | 11/2010 | Zou | F24F 3/0442 165/205 |
| 8,033,479 | B2* | 10/2011 | Kates | F24F 11/006 236/1 B |
| 8,165,719 | B2* | 4/2012 | Kinney | E06B 7/08 318/266 |
| 8,348,732 | B2* | 1/2013 | Aronstam | F24F 3/00 236/49.1 |
| 8,477,010 | B2* | 7/2013 | Cheron | G08C 19/28 340/5.2 |
| 8,533,525 | B2* | 9/2013 | Matsugashita | G06F 11/1662 714/4.11 |
| 2003/0070182 | A1* | 4/2003 | Pierre et al. | 725/135 |
| 2005/0207376 | A1* | 9/2005 | Ashwood-Smith | H04L 45/20 370/338 |
| 2006/0044152 | A1 | 3/2006 | Wang | |
| 2006/0071087 | A1* | 4/2006 | Kates | F24F 11/006 236/1 B |
| 2007/0085701 | A1* | 4/2007 | Walters | G06Q 30/04 340/870.02 |
| 2007/0213879 | A1* | 9/2007 | Iwamura | 700/292 |
| 2008/0220722 | A1* | 9/2008 | Smith | 455/41.3 |
| 2009/0103535 | A1* | 4/2009 | McCoy et al. | 370/392 |
| 2009/0154343 | A1 | 6/2009 | Fitch et al. | |
| 2009/0287456 | A1* | 11/2009 | Tran et al. | 702/188 |
| 2010/0006660 | A1* | 1/2010 | Leen | G05D 23/1931 236/51 |
| 2010/0131627 | A1* | 5/2010 | Son et al. | 709/221 |
| 2010/0332034 | A1* | 12/2010 | Bergeson | E06B 7/08 700/275 |
| 2011/0298301 | A1* | 12/2011 | Wong et al. | 307/116 |
| 2012/0011233 | A1* | 1/2012 | Dixon et al. | 709/221 |
| 2012/0154126 | A1* | 6/2012 | Cohn et al. | 340/10.51 |
| 2013/0069541 | A1* | 3/2013 | Feri et al. | 315/152 |

OTHER PUBLICATIONS

French Search Report and Written Opinion dated Jan. 24, 2011 for corresponding French Application No. 1055263 filed Jun. 29, 2010.
International Search Report and Written Opinion dated Oct. 6, 2011 for corresponding International Application No. PCT/FR2011/051414 filed on Jun. 20, 2011.

\* cited by examiner

MANAGING APPLICATION FAILURES IN A SYSTEM OF DOMESTIC APPLIANCES

CROSS-REFERENCE TO RELATED APPLICATIONS

This application is a Section 371 National Stage Application of International Application No. PCT/FR2011/051414, filed Jun. 20, 2011, which is incorporated by reference in its entirety and published as WO 2012/001267 on Jan. 5, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of remotely controlling domestic appliances.

The present disclosure relates in particular to the field of systems in which a management module, generally referred to as a "home automation box", provides centralized management of the operation of domestic appliances, in particular on the basis of information delivered by sensors.

BACKGROUND OF THE DISCLOSURE

Known systems of that kind are constituted, for example, by systems for managing comfort, serenity, and/or energy, e.g. a system managing the opening and closing of shutters in a dwelling as a function of outside light levels or a system enabling the temperature inside a house to be reduced on the basis of information provided by presence detectors.

Figure 1:
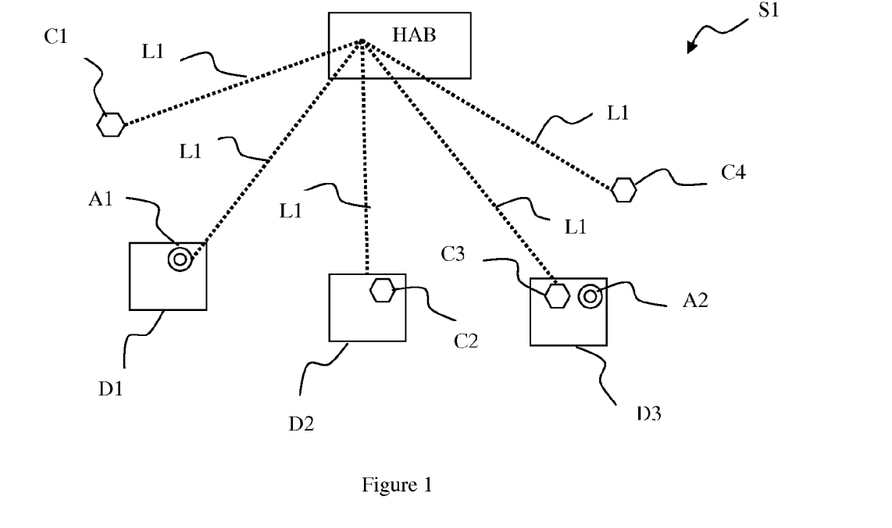
FIG. 1 is a diagram showing a prior art management system.

FIG. 1 shows an example of a prior art system S1.

The system S1 comprises a plurality of pieces of equipment, e.g. five pieces, that are connected to a management module HAB (for "home automation box") via respective communications links L1, e.g. wireless links. The pieces of equipment comprise data-gathering equipment and equipment that is to be controlled. A piece of data-gathering equipment may be a sensor (C1, C4) or a domestic appliance (D2, D3) that includes one or more sensors (C2, C3). The sensors C1, C2, C3, C4, . . . are suitable for gathering data and for passing it to the management module HAB. A piece of equipment that is to be controlled is a domestic appliance (D1, D3) having one or more actuators (A1, A2) suitable for controlling the domestic appliance. It should be observed that a piece of equipment may include both a sensor and an actuator. Depending on the data that is passed along by the sensors, the management module HAB transmits commands to the actuators as a function of predetermined usage rules. For example, the sensors C1, C2, . . . may be light sensors and the actuators A1, A2 may serve to open and close shutters. A usage rule stored in a memory of the management module HAB serves to cause the shutters to be opened if the sensor C1 and the sensor C2 indicate a high level of light, and to cause the shutters to be closed, otherwise.

If an application running in the management module fails, that leads to the system ceasing to function. The pieces of equipment no longer receive any new orders and they remain in the state in which they were at the time of the failure. For example, the shutters remain closed in broad daylight.

This situation is difficult for the customer to accept, particularly if the failure persists for any length of time.

There also exists a need for a solution that enables an application failure in the management module to be mitigated.

SUMMARY

An embodiment of the invention provides a method of managing a system comprising a management module and a set of pieces of equipment connected to the management module via respective first communications links, said set comprising at least one piece of equipment that is to be controlled and at least one piece of data-gathering equipment, said management module being suitable for determining at least one control command as a function of data received from at least one piece of data-gathering equipment via the first communications link and for transmitting said at least one control command that has been determined to at least one piece of equipment that is to be controlled; the method being characterized in that it comprises the following steps:

monitoring application signaling activity from said management module;

detecting an absence of application signaling activity over a predetermined time period; and triggering a minimum service by sending an alert message to at least one piece of equipment of the system in the event of detecting an absence of application signaling activity.

The absence of application signaling activity by the management module, i.e. an absence of received data signals being processed or an absence of command signals being transmitted, e.g. such as control command messages, by the management module over a predetermined period of time suggests an application failure of the management module. In an embodiment of the invention, continuously verifying the application operation of the management module makes it possible to detect an application failure as soon as it happens. An alert message transmitted to all or some of the equipment in the system serves to inform the equipment about the failure. Equipment that has received the alert message then provides a minimum service in which the pieces of equipment communicate directly with one another and no longer with the management module. The minimum service makes it possible in particular for a piece of equipment that is to be controlled to be controlled directly by one or more pieces of data-gathering equipment or sensors.

The management method of an embodiment of the invention may for example be implemented in a detection device connected to the management module or incorporated in one of the pieces of equipment in the system.

In a particular implementation of the management method, the monitoring step comprises a step of receiving operating messages from the management module, and activity is detected as being absent in the event of not receiving an operating message over a predetermined time period.

Receiving specific messages transmitted regularly by the management module to one or more predetermined devices constitutes a simple way of verifying that the management module is active. Failure to receive any such message over a predetermined time period indicates that the management module has suffered an application failure.

In a particular implementation of the management method, the monitoring step comprises a step of regularly sending a monitoring message and activity is detected as being absent in the event of not receiving a message in response to said monitoring message within the predetermined time period.

The failure to respond to a monitoring message within a predetermined time period makes it easy to detect that there is an anomaly in the application operation of the module.

By way of example, the response message may consist in incrementing the value of a counter in a detection device so as to prevent the counter being decremented down to zero, with the counter reaching the value zero corresponding to the predetermined time period being exceeded.

According to a particular feature, the first communications link is a wireless link over which an alert message of the invention is transmitted in broadcast mode. This configuration makes it possible to warn all of the pieces of equipment by sending a single alert message.

An embodiment of the invention also provides a method of providing a minimum service in a system comprising a management module and a set of pieces of equipment connected to the management module via respective first communications links, said set including at least one piece of equipment that is to be controlled and at least one piece of data-gathering equipment, said at least one piece of data-gathering equipment being suitable for transmitting data to said management module via the first communications link, the method being characterized in that it includes the following steps:

receiving an alert message; and
on receiving an alert message, transmitting or receiving at least one command message for at least one piece of equipment that is to be controlled via a second communications link.

A device for providing a minimum service and connected to or installed in a piece of data-gathering equipment, and receiving an alert message makes it possible to trigger setting up a minimum service in which one or more control commands are transmitted directly to an actuator of a piece of equipment that it to be controlled by a piece of data-gathering equipment.

An alert message being received by a device for providing a minimum service that is connected to or installed in a piece of equipment that is to be controlled makes it possible to trigger the setting up of a minimum service in which an actuator of a piece of equipment that is to be controlled receives one or more control commands directly as transmitted by a piece of data-gathering equipment.

In a particular implementation of the method of providing a minimum service, the transmission or reception step is preceded by a step of activating said second communications link with said at least one piece of equipment that is to be controlled.

This implementation is particularly adapted to wireless communications links and makes it possible for direct pairing to be established between pieces of data-gathering equipment and pieces of equipment that are to be controlled.

According to a first particular feature of this implementation, the activation step is performed by a device inserted in a piece of data-gathering equipment and there is no need to modify the piece of equipment that is to be controlled, which continues to process commands in like manner regardless of whether they come from a management module or from a piece of data-gathering equipment.

According to a second particular feature of this implementation, the activation step is performed firstly by a device inserted in a piece of data-gathering equipment and secondly by a device inserted in a piece of equipment that is to be controlled. This configuration enables direct and mutual pairing to be established between the two pieces of equipment and it increases safety by avoiding commands being executed that come from a piece of equipment that is not known to the piece of equipment that is to be controlled.

According to a particular feature of this implementation of the method of providing a minimum service, the activation step includes a step of a piece of equipment obtaining at least one identifier of one or more pieces of equipment with which it is to establish pairing.

A list of pieces of equipment with which a given piece of equipment is to establish direct pairing in the event of receiving an alert message is recorded in a memory of said piece of equipment and enables a minimum service to be provided simply and quickly.

According to a particular feature of the method of providing a minimum service, the second activation link remains activated until a connection request message is received from the management module.

An embodiment of the invention provides a detection device, characterized in that it comprises:

monitoring means for monitoring application signaling activity from said management module;
detection means for detecting an absence of application signaling activity over a predetermined time period; and
trigger means for triggering a minimum service by transmitting an alert message to at least one piece of equipment of the system in the event of detecting an absence of application signaling activity.

This detection device is either a self-contained device installed in the system, or else it is incorporated in a piece of data-gathering equipment or indeed in a piece of equipment that is to be controlled.

In an embodiment, the detection device is incorporated in all or some of the equipment of the system.

According to a particular feature of this embodiment, some detection devices are inactive and are activated on command. This embodiment is simple to implement and provides the system with flexibility. By way of example, the active device(s) is/are selected as a function of the geographical location of the device in the system, its communications range, or indeed as a function of the type of electrical power supply of the piece of equipment in which it is installed.

An embodiment of the invention provides a device for providing a minimum service, the device being characterized in that it comprises:

receiver means for receiving an alert message; and
communications means suitable for transmitting or receiving at least one command message for at least one piece of equipment that is to be controlled via a second communications link, after receiving the alert message.

Such a device is a self-contained module connected to a piece of data-gathering equipment or to a device incorporated in a piece of data-gathering equipment. The communications means are then transmission means.

Such a device is either a self-contained module connected to a piece of equipment that is to be controlled or else a device that is incorporated in a piece of equipment that is to be controlled. The communications means are then reception means.

In a particular embodiment, the communications means of the device for providing a minimum service further comprise means for activating said second communications link with said at least one piece of equipment that is to be controlled.

An embodiment of the invention provides a device for providing a minimum service as described above and characterized in that it further comprises a detection device as described above.

An embodiment of the invention provides a data-gathering equipment comprising transmission means suitable for transmitting at least one result of measurements to a management module via first communications link, the equipment being characterized in that it also includes a detection device and/or a device for providing a minimum service as described above.

An embodiment of the invention provides equipment that is to be controlled, the equipment comprising receiver means suitable for receiving at least one control command coming form a management module via a first communications link, the equipment being characterized in that it further comprises:

receiver means for receiving an alert message; and receiver means for receiving at least one control message coming from a piece of data-gathering equipment via a second communications link after receiving the alert message.

An embodiment of the invention provides a system comprising a management module and a set of pieces of equipment connected to the management module via respective first communications links, said set comprising at least one piece of equipment that is to be controlled and at least one piece of data-gathering equipment, said module being suitable for determining at least one control command as a function of data received from at least one piece of data-gathering equipment and for transmitting said at least one control command that has been determined to at least one piece of equipment that is to be controlled, the system being characterized in that it further includes at least one detection device and at least one device for providing a minimum service as described above.

An embodiment of the invention also provides a computer program including instructions for implementing the steps of a management method as described above when loaded and executed by a processor.

Finally, an embodiment of the invention provides a computer program product including instructions for implementing the steps of a method as described above for providing a minimum service when loaded and executed by a processor.

BRIEF DESCRIPTION OF THE DRAWINGS

Other features and advantages appear from the following description of implementations given by way of non-limiting example with reference to the accompanying drawings, in which.

DETAILED DESCRIPTION OF ILLUSTRATIVE EMBODIMENTS

A first implementation of the invention is described below with reference to FIGS. 2a, 2b, 2c, and 3.

Figure 2A:
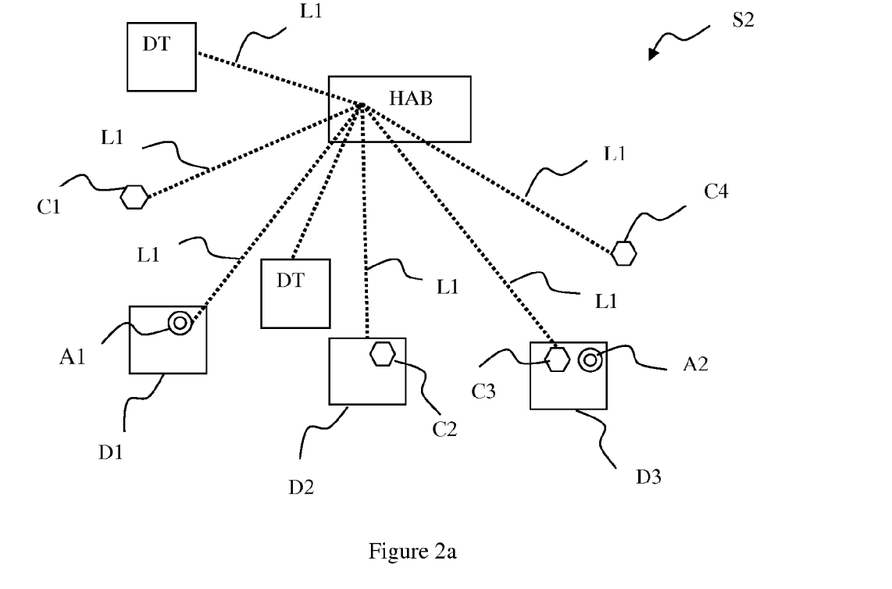
FIG. 2a is a diagram showing a management system in an embodiment of the invention.

With reference to FIG. 2a, system S2 comprises a management module HAB and a plurality of devices, e.g. seven devices, suitable for communicating with the management module HAB via respective first communications links L1. The plurality of devices comprise data-gathering equipment, equipment that is to be controlled, a detector device DT, and a coordination device DC. Data-gathering equipment may either be a sensor or a domestic appliance including one or more sensors. Equipment that is to be controlled includes one or more actuators. In this example, the data-gathering equipment comprises sensors C1 to C4 together with domestic appliances D2 and D3. The domestic appliance D2 includes a sensor C2 and the domestic appliance D3 includes a sensor C3. The equipment that is to be controlled in this example comprises devices D1 and D3. Each includes a respective actuator A1, A2. The equipment D3 constitutes both data-gathering equipment and equipment that is to be controlled.

The data-gathering equipment and the equipment that is to be controlled are referred to collectively as the equipment.

By way of example, the system S2 is installed in a building, e.g. in a dwelling.

By way of example, the sensor C1 is a presence detector installed in the sitting room of the dwelling. By way of example, the sensor C2 is a light detector installed on an outside windowsill of a window in the sitting room. By way of example, the sensors C3 and C4 are sensors for measuring temperature and they are installed in bedrooms of the dwelling.

By way of example, the actuator A1 is a switch connected to a sitting-room lamp and, for example, the actuator A2 is a temperature regulator installed in one of the bedrooms.

As an alternative, the numbers and/or the types of the sensors and the actuators may be different.

In the embodiment described, the first communications link L1 is a wireless link of the WiFi type.

As an alternative, the first wireless link could be a wireless link of the Bluetooth or ZigBee type or indeed it could be a wired communications link.

The management module HAB is suitable for receiving the results of measurements taken by the sensors C1, C2, C3, . . . , and for constructing and transmitting a control command to an actuator as a function of the measurement results from one or more sensors and as a function of one or more usage rules.

By way of example, a usage rule may be <<if presence is detected by the sensor C1 and if the light level detected by the sensor C2 is "NIGHT", then send the "ON" command to the actuator A1 of the equipment E2 that is to be controlled>>.

The measurement results transmitted by a sensor may for example be a change-of-state command (e.g. changing from DAY to NIGHT).

As an alternative, a measurement result is a state (NIGHT) or indeed data that has been gathered (e.g. a light level index).

As an alternative, the sensor C1 transmits the data it has gathered to the management module at regular intervals.

In the embodiment described, the coordination device DC is a stand-alone device. Alternatively, the coordination device DC is incorporated in the detection device DT or indeed in any piece of equipment of the system. The location of the coordination device may for example be selected as a function of criteria concerning either a self-contained energy supply so as to be capable of operating in the event of a power cut, or else a communications range relative to other pieces of equipment of the system.

Figure 3:
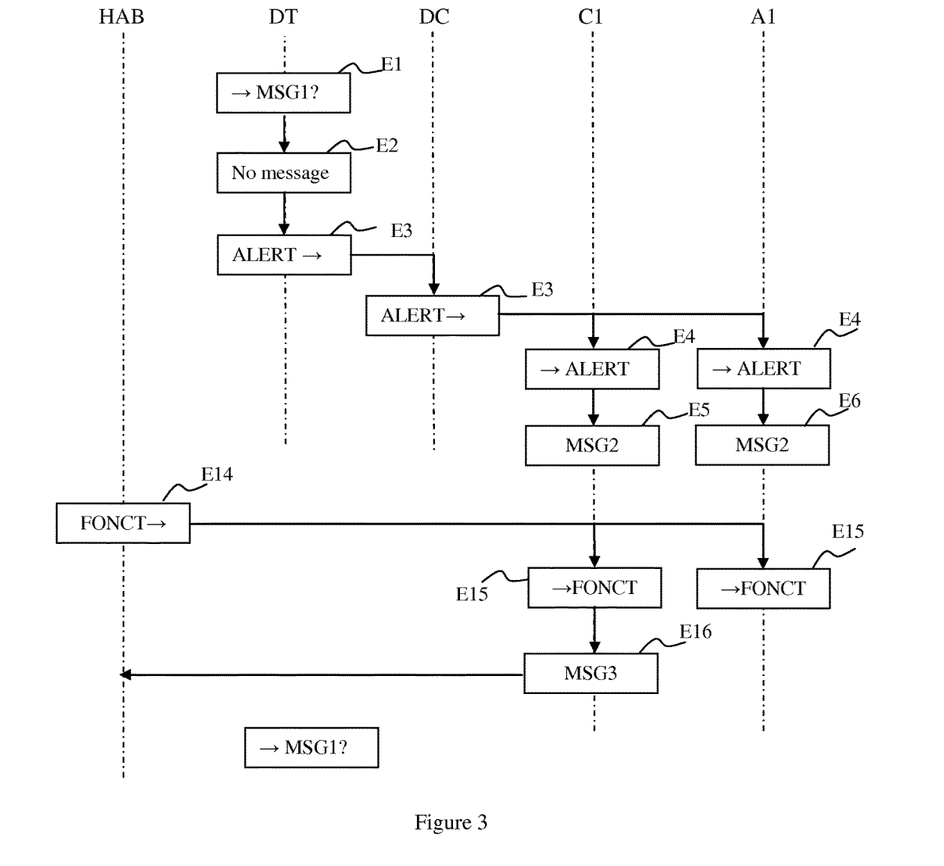
FIG. 3 is a flow chart showing the various steps of a first implementation of a management method, and of a method of providing a minimum service, as performed in a management system.

The steps of a management method of an embodiment of the invention, and of a method of providing a minimum service of an embodiment of the invention as performed by the system S2 are described below with reference to FIG. 3.

Steps E1, E2, and E3 represent the steps of the management method implemented by the detection device DT.

Steps E4 and E5 represent the steps of the method of providing a minimum service that are performed by a data-gathering device of an embodiment of the invention, e.g. the sensor C1.

During a first step E1, the detection device DT monitors the application signaling activity of the management module HAB. In the implementation described, this step consists in the detection device DT scanning for the arrival of application messages from the management module HAB via the first communications link L1.

An application message is a message transmitted at application level.

For example, the detection device DT waits for the regular arrival of operating messages MSG1 transmitted by the management module HAB.

Alternatively, the detection device DT regularly transmits a monitoring message to the management module HAB, and the management module HAB sends a message in response to the monitoring message.

Also by way of alternative, the detection device DT is suitable for detecting application messages transmitted by the management module HAB to devices of the system.

During a step E2, the detection device DT detects the absence of application signaling activity by the management module HAB over a predetermined time period.

For example, the detection module DT detects that no operating message MSG1 has been received within a predetermined time period.

Step E2 is followed by a step E3 during which the detection device DT sends an alert message ALERT to the coordination device DC, and the coordination device DC relays this message ALERT to all of the pieces of equipment in the system S2.

Figure 2B:
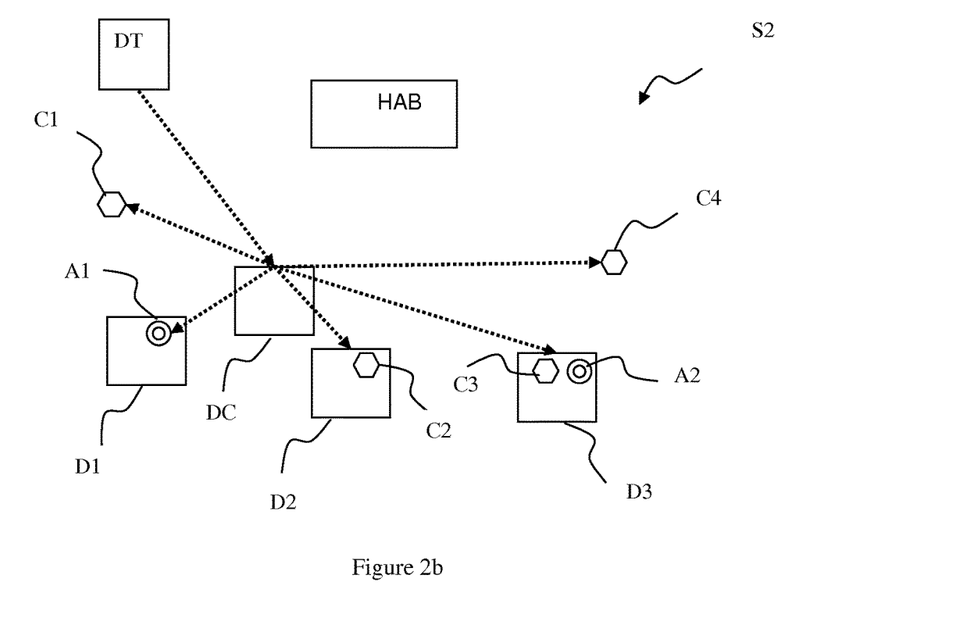
FIG. 2b is a diagram showing the transmission of an alert message in the management system.

FIG. 2b shows the transmission of the alert message by the detection device DT to the coordination detection DC, and the transmission of the alert message by the coordination device DC to the pieces of equipment of the system, i.e. to the data-gathering equipment and to the equipment that is to be controlled.

Alternatively, the message relayed to each piece of equipment by the coordination device DC is adapted as a function of that piece of equipment by the coordination device DC.

Also by way of alternative, during step E3, the detection device DT transmits the alert message ALERT directly to the pieces of equipment of the network.

Also by way of alternative, the alert message ALERT is transmitted only to certain predetermined pieces of equipment.

The alert message ALERT is received by the equipment during a step E4.

In the presently-described implementation, the equipment D1 that is to be controlled and that contains the actuator A1 receives the message ALERT but does not process it. In this implementation, an actuator executes any command reaching it, whether transmitted by the management module HAB or by some other device of the system. This implementation does not require the actuators to have devices installed for providing a minimum service, and thus enables the cost of implementation to be kept low.

During a step E5, and after receiving the alert message ALERT, the data-gathering equipment provides a minimum service, or "fallback mode", in which control commands are transmitted to predetermined pieces of equipment that are to be controlled via the second communications link L2.

Figure 2C:
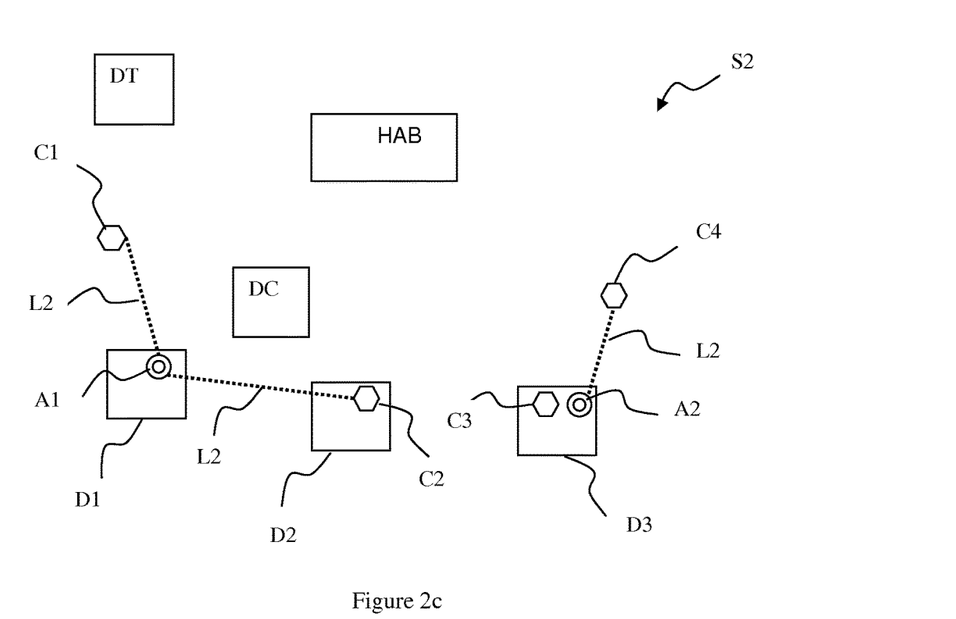
FIG. 2c is a diagram showing an example of communications established after receiving an alert message in the management system.

FIG. 2c shows an example of communications established by the data-gathering equipment on receiving an alert message.

For example, in step E5, after receiving the alert message ALERT, the sensor C1 detects a change in the measurements it takes, e.g. a "day/night" change, and it constructs a command message MSG2 and transmits the message MSG2 that it has constructed to the actuator A1 via the second communications link L2.

In this example, the communications link L2 is a communications link between the sensor C1 and the actuator A1.

The second communications link L2 is a wireless link of the WiFi type.

As an alternative, the second wireless link is a wireless link of the Bluetooth or ZigBee type or indeed it is a wired communications link.

The message MSG2 is received by the actuator A1 during a step E6, and the actuator A1 executes the command it has received, e.g. by putting the switch of the lamp into the "ON" position.

The steps E5 and E6 are then reiterated as a function of the measurements taken by the sensors.

During a step E14, the management module HAB transmits an operating message FONCT to all of the equipment of the system.

The operating message FONCT is received by the equipment during a step E15.

During a step E16, the sensor C1 that receives the operating message FONCT and that has measurement results for transmission, transmits a message MSG3 containing the results of the measurements taken to the management module HAB via the first communications link L1.

In the embodiment described, the alert message ALERT is generated and transmitted by the detection module DT. Alternatively, or in addition to this implementation, the alert message ALERT is generated and transmitted by the management module HAB, e.g. in the event that the management module HAB is about to put itself on "application standby", e.g. for the purpose of updating certain application software programs.

A detailed implementation of the management method, and of the method of providing a minimum service, in which the communications links are links of the ZigBee type, is described below with reference to FIGS. 4 to 6.

Figure 4:
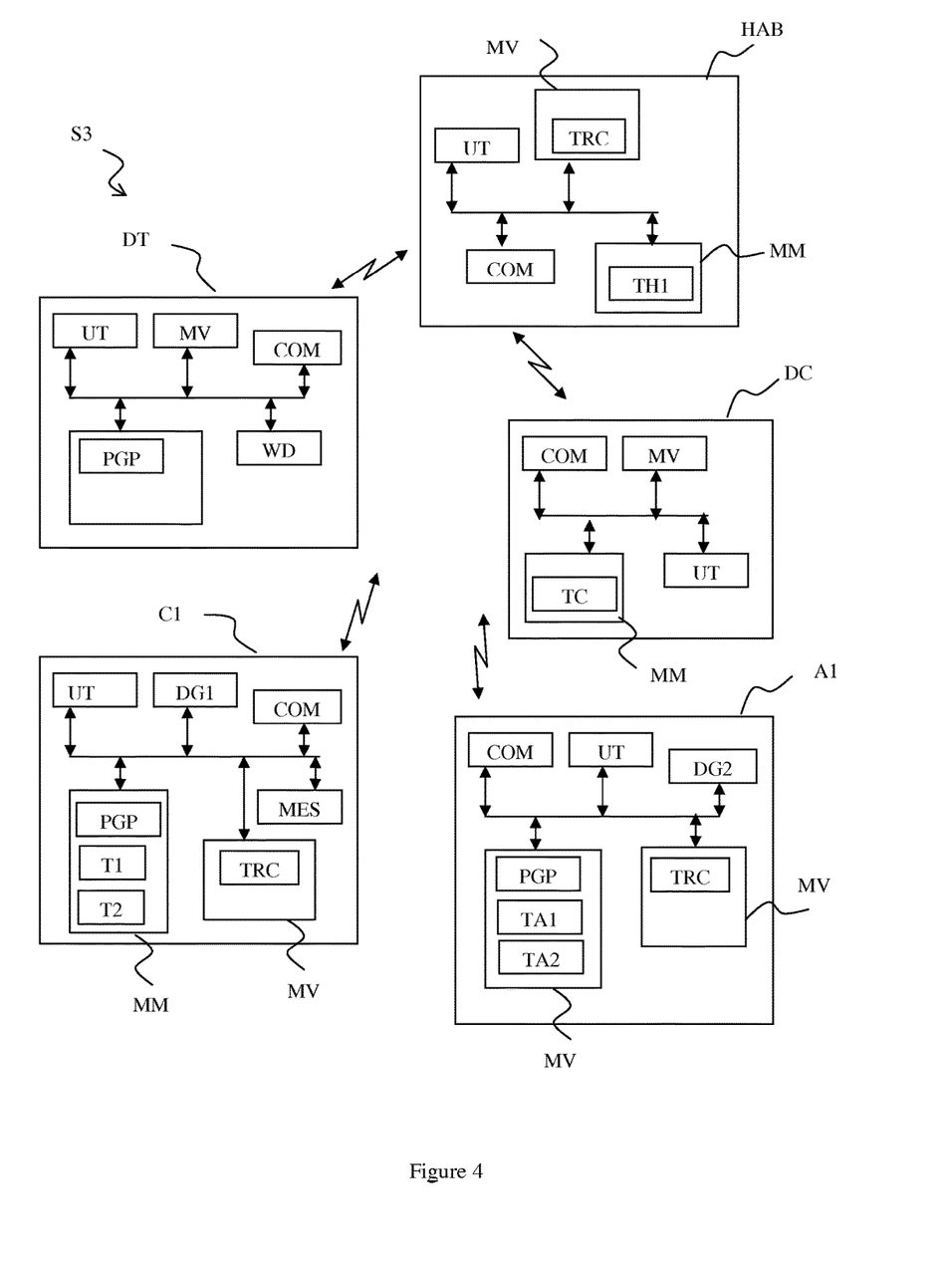
FIG. 4 is a block diagram showing devices of a management system in an embodiment of the invention.

As shown in FIG. 4, a system S3 has five devices: a management module HAB, a detection device DT, a coordination device DC, a sensor C1, and an actuator A1. The sensor C1 represents a data-gathering device. The actuator A1 is inserted in a piece of equipment E that is to be controlled.

In known manner, each device includes in particular a processor unit UT fitted with a microprocessor, a read only memory (ROM) MM that may possibly be of the electrically erasable and programmable ROM (EEPROM) type, and a random access memory (RAM) MV.

Each device also has a communications module COM suitable for communicating with one or more remote devices via a communications link. The remote device(s), and consequently the communications link(s), are for example determined by a current routing table TRC, e.g. stored in a RAM MV of the device.

When a device is switched on, a routing table is selected. By way of example, the routing table is read in the ROM MM of the device and is stored in the current routing table TRC of the RAM.

By way of example, a routing table contains at least one identifier of the source device, i.e. of the device in which it is stored, and at least one identifier of at least one destination device, i.e. a device with which the device is capable of communicating.

Alternatively, the identity of the source device is stored in the ROM MM independently of the routing table and the routing table has only one or more identifiers for one or more destination devices.

After the current routing table TRC has been selected, a pairing procedure is performed. In known manner, the procedure consists in a source device sending a pairing request message to one or more destination devices entered in the current routing table TRC. On receiving the pairing request message, the destination device verifies the received identifiers as a function of its own current routing table TRC, and if the verification is positive, it returns an agreement message. This pairing procedure enables a communications link to be activated between two devices.

The sensor C1 also possesses a measurement module MES and a device DG1 for providing a minimum service.

The ROM MM of the sensor C1 has registers storing a computer program PGE including program instructions adapted to performing the steps of a method of an embodiment of the invention for providing a minimum service.

On switching on, the program PGE stored in the EEPROM type memory MM1 is transferred to the RAM MV of the sensor C1, which then contains executable code together with registers for storing the variables needed for performing a method of providing a minimum service as described in detail below in the description.

The measurement module MES of the sensor C1 is suitable for taking measurements regularly, e.g. light measurements, for detecting a change in light level on the basis of measurements taken, and for transmitting a results message, e.g. to the communications module COM. For example, the results message is a command containing a parameter indicating the action to be performed by the equipment that is to be controlled (e.g. transmitting the "ON" command to the actuator in the lamp).

The detection device DT also possesses a monitoring module WD.

The ROM MM of the detection device DT has registers storing a computer program PGP including program instructions adapted to performing the steps of a management method of an embodiment of the invention.

On switching on, the program PGP stored in the EEPROM type memory MM is transferred to the RAM MV of the detection device DT which then contains executable code together with registers for storing the variables needed for implementing a management method as described in detail below in the description.

In most general manner, storage means readable by a computer or by a microprocessor, optionally incorporated in the device, and possibly removable therefrom, serve to store a program implementing the steps of a management method of an embodiment of the invention.

The actuator A1 also has a command module CMD suitable for executing a command order, e.g. closing the shutters or raising ambient temperature.

During a prior step, one or more routing tables are stored in the ROM of each device. More precisely, a routing table TH1 stored in the management module HAB contains at least one identifier of the detection device DT, of each data-gathering device, and of each piece of equipment to be controlled. First and second routing tables T1 and T2 are stored in the sensor C1. First and second routing tables TA1 and TA2 are stored in the actuator A1. The routing table TC stored in the coordination device DC contains at least one identifier of each piece of equipment. The routing tables T1 and TA1 contain at least one identifier of the management module HAB. The routing tables T2 contain an identifier of the actuator A2 and the routing table TA2 contains at least one identifier of the sensor C1.

Figure 5:
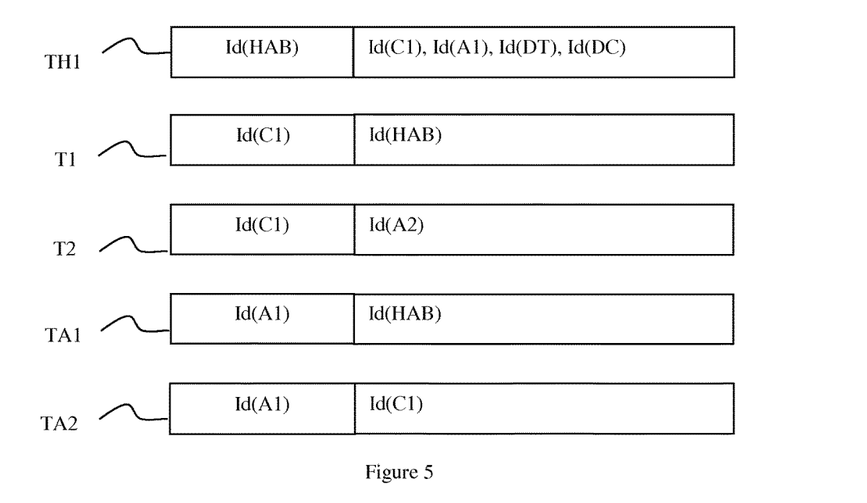
FIG. 5 is a diagram illustrating routing tables stored in devices of a management system in an embodiment of the invention.

FIG. 5 shows examples of the routing tables TH1, T1, T2, TA1, and TA2 stored in the ROMs of the devices HAB of identifier Id(HAB), C1 of identifier Id(C1), or A1 of identifier Id(A1), respectively.

During a starting step, the first routing tables are read from the ROMs and stored in the RAMs. Thereafter, the management module HAB initiates a pairing procedure with each device C1, A1, DT, and DC.

Following this pairing procedure, a first communications link is established between each device and the management module HAB.

Following the pairing step, the management module HAB is capable of receiving messages coming from the sensors, of constructing control messages as a function of the received messages and as a function of usage rules, and of transmitting the constructed control messages to one or more paired actuators.

In parallel, the monitoring module WD of the detection device DT monitors the activity of the management module HAB (step E0).

In the embodiment described, the module WD is for example created on the basis of the ZigBee standard (ZigBee specification, ZigBee document 053474r17, Oct. 19, 2007).

The module WD is adapted to wait for an operating message coming from the management module HAB. The operating message is an application message, e.g. a command of the type "Arm Command". On receiving this command, the module WD initializes or reinitializes a counter with a predetermined value. Thereafter, the counter is decremented over time.

During step E1, the monitoring module WD detects that the counter has reached the value 0, indicating that no application message has been received from the management module HAB over the predetermined time period. This absence of reception means there has been an application failure in the management module HAB.

The monitoring module WD then sends an alert message ALERT to the coordination device DC (step E3). By way of example, the transmitted alert message is a "Default Binding Command". The alert message is received by the coordination device DC and is relayed in broadcast mode to the data-gathering equipment and to the equipment that is to be controlled of the system S3. The device DC is positioned in the system so as to be in communication by wireless communications links with all of equipment. It serves to relay the alert message coming from the detection device DT.

Alternatively, the monitoring module WD transmits the alert message in broadcast mode to the data-gathering equipment and to the equipment that is to be controlled of the system S3.

Alternatively, the command is transmitted in multicast mode.

Figure 6:
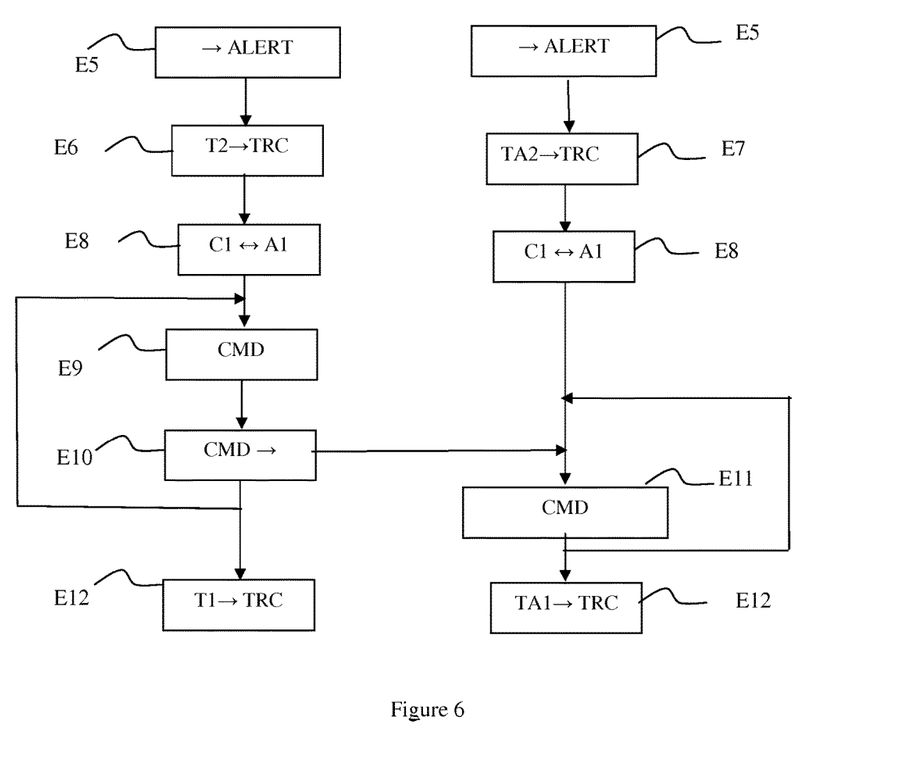
FIG. 6 is a flow chart showing the various steps of a second implementation of a method of providing a minimum service.

With reference to FIG. 6, there follows a description of an implementation of the method of providing a minimum service as implemented by the minimum service provision devices of the sensor C1 and of the actuator A2 respectively.

The alert message is received by the equipment of the network (step E4) and in particular by the sensor C1 and by the actuator A1.

Thereafter, during a step E6, the device DG1 for providing a minimum service in the sensor C1 accesses the second routing table T2 (also known as the Default Binding Table) that is stored in its ROM MM and stores it in the current routing table TRC that is stored in the RAM MV of the sensor C1. The second routing table T2 thus replaces the first routing table T1 of the sensor C1.

During a step E7, performed in parallel with the step E6, the device DG2 for providing a minimum service in the actuator A2 accesses the second routing table TA2 stored in its ROM MM and stores it in the current routing table TRC stored in the RAM MV of the actuator A1. The second routing table TA2 thus replaces the first routing table of the actuator A1.

Thereafter, during a step E8, the device DG1 for providing a minimum service in the sensor C1 runs a pairing procedure as a function of the second routing table T2. This pairing procedure, in this example, provides direct pairing of the sensor C1 with the actuator A1.

During a step E9, the sensor C1 detects a change in light level and the processor unit UT constructs a command message CMD, with the device DG1 for providing the minimum service causing the command message CMD to be transmitted to the actuator A1 during a step E10.

Alternatively, the command message CMD is constructed on the basis of data gathered by a plurality of sensors.

During a step E11, the message CMD is received by the actuator A1 and the actuator A1 executes the command CMD.

The steps E9 to E11 are reiterated one or more times as a function of the measurements taken.

During step E12, following a return to operation of the management module HAB, the sensor C1 receives a pairing request from the management module HAB. It then accesses its first routing table T1 and stores it in the current routing table TRC as a replacement for the second routing table T2.

The pairing request transmitted by the management module HAB is also received by the actuator A1, and on receiving this pairing request the actuator A1 replaces its current management table with its first management table TA1.

The measurements taken by the sensor C1 are then transmitted to the management module HAB.

Alternatively, while selecting a selection table, only one routing table identifier is stored in RAM and pairing is performed as a function of the pairing table having its identifier stored in RAM.

Also, and alternatively, the measurement results transmitted by the sensor C1 to the management module HAB comprise gathered data as measured by the sensor but not processed by the sensor C1, and during the step E9, the gathered data is transmitted to the device DG1 for providing the minimum service. During the step E10, the command message CMD is constructed by a command construction module (not shown) of the device DG1 for providing the minimum service prior to being transmitted to the actuator A1.

Figure 7:
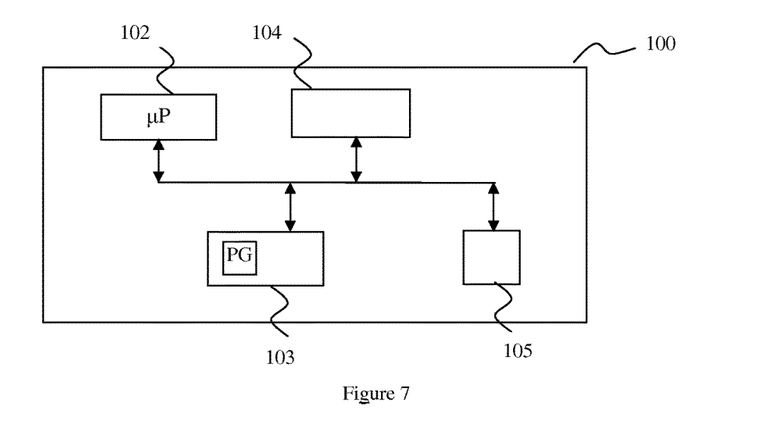
FIG. 7 is a block diagram showing a device suitable for performing the steps of an implementation of a method of providing a minimum service.

In an embodiment selected and shown in FIG. 7, a device implementing the method of the invention for providing a minimum service is for example a device 100 comprising in known manner in particular: a processor unit 102 having a microprocessor; a ROM or EEPROM 103, a RAM 104; and a communications interface 105.

The device 100 also has means for accessing a memory of an associated sensor or of associated data-gathering equipment. For example, the device 100 is suitable for dialoging with the sensor or with the data-gathering device via a communications module (not shown) over a wired or wireless link.

The ROM 103 has registers storing a computer program PG including program instructions adapted to perform the steps of a method of an embodiment of the invention for providing a minimum service.

On being switched on, the program PG stored in the EEPROM 103 is transferred to the RAM, which then contains executable code and registers for storing the variables needed for implementing a step of receiving an alert message and a step performed on reception of an alert message of transmitting or receiving at least one command message for at least one piece of equipment that is to be controlled via second communications link.

More generally, storage means readable by a computer or by a microprocessor, optionally incorporated in the device, and possibly being removable, serves to store a program implementing the steps of a management method of an embodiment of the invention.

Although the present disclosure has been described with reference to one or more examples, workers skilled in the art will recognize that changes may be made in form and detail without departing from the scope of the disclosure and/or the appended claims.

The invention claimed is:

1. A method of managing a system comprising a management module, a detection device, and a set of pieces of equipment connected to the management module via respective first communications links, said set comprising at least one piece of equipment that is to be controlled and at least one piece of data-gathering equipment, each piece of equipment of said set that is to be controlled comprising a domestic appliance having an actuator configured to perform functional adjustments of the domestic appliance, said management module being configured for determining at least one control command as a function of data received from at least one piece of data-gathering equipment of the set via the corresponding at least one respective first communications link and for transmitting said at least one control command that has been determined to at least one piece of equipment of the set that is to be controlled; wherein the method comprises the following acts performed by the detection device:

monitoring application signaling activity from said management module via the respective first communications link;

detecting from said monitoring an absence of the application signaling activity over a predetermined time period; and triggering a minimum service by sending an alert message to at least one piece of equipment of the set of pieces of equipment in the event of detecting the absence of application signaling activity for the predetermined time period, wherein the minimum service corresponds to a service in which the pieces of equipment of said set communicate directly with one another via a second communications link instead of the respective first communication link used to communicate with the management module, and wherein a piece of equipment of the set that is to be controlled receives from the at least one piece of data-gathering equipment of said set at least one command message via said second communications link, directly between said at least one piece of data-gathering equipment of said set and said piece of equipment of said set that is to be controlled by the at least one command message, said at least one command message being determined by said at least one piece of data-gathering equipment as a function of data received by this data-gathering equipment to control the functional adjustments of the corresponding domestic appliance, said at least one command message being sent after reception of said alert message by said piece of data-gathering equipment.

2. The method according to claim 1, wherein monitoring comprises receiving operating messages from the management module, and wherein the application signaling activity is detected as being absent in the event of not receiving an operating message over a predetermined time period.

3. The method according to claim 1, wherein monitoring comprises regularly sending a monitoring message, and wherein the application signaling activity is detected as being absent in the event of not receiving a message in response to said monitoring message within the predetermined time period.

4. The method according to claim 1, wherein the respective first communications links are wireless links over which transmitting the alert message is performed in broadcast mode.

5. A method of providing a minimum service in a system comprising a management module and a set of pieces of equipment connected to the management module via respective first communications links, said set including at least one piece of equipment that is to be controlled and at least one piece of data-gathering equipment, each piece of equipment of the set that is to be controlled comprising a domestic appliance having configured to perform functional adjustments of the domestic appliance, said at least one piece of data-gathering equipment of the set being configured for transmitting data to said management module via the corresponding at least one respective first communications link, the method comprising the following acts performed by a piece of equipment of said set:

receiving, by the piece of equipment of the set, an alert message, the alert message indicating an absence of signaling activity from said management module, and the alert message triggering the minimum service, which corresponds to a service in which the pieces of equipment of said set communicate directly with one another via a second communications link instead of via the first respective communication link used to communicate with the management module; and after receiving the alert message, transmitting or receiving, by said piece of equipment of the set, at least one command message for at least one piece of equipment of the set that is to be controlled via said second communications link, directly between said one piece of equipment of the set and said piece of equipment of said set that is to be controlled by the at least one command message, wherein said at least one command message is determined by a piece of data-gathering equipment of the set as a function of data received by this data-gathering equipment to control the functional adjustments of the corresponding domestic appliance.

6. The method according to claim 5, wherein the transmitting is preceded by activating said second communications link with said at least one piece of equipment of the set that is to be controlled.

7. The method according to claim 6, wherein the second communications link remains activated until a connection request message is received from the management module.

8. A detection device comprising:

a non-transitory computer-readable medium comprising instructions stored thereon; and a processor configured by the instructions to perform acts comprising:

monitoring application signaling activity from a management module, which is connected to a set of pieces of equipment via respective first communications links, said set comprising at least one piece of equipment that is to be controlled and at least one piece of data-gathering equipment, each piece of equipment of the set that is to be controlled comprising a domestic appliance having an actuator configured to perform functional adjustments of the domestic appliance, said management module being configured for determining at least one control command as a function of data received from at least one piece of data-gathering equipment of the set via the corresponding at least one respective first communications link and for transmitting said at least one control command that has been determined to at least one piece of equipment of the set that is to be controlled;

detecting an absence of the application signaling activity from the management module over a predetermined time period, monitored during the act of monitoring; and triggering a minimum service by transmitting an alert message to at least one piece of equipment of the set in the event of detecting the absence of the application signaling activity, wherein the minimum service corresponds to a service in which the pieces of equipment of said set communicate directly with one another via a second communications link instead of the respective first communication link used to communicate with the management module, and wherein a piece of equipment of the set that is to be controlled receives from the at least one piece of data-gathering equipment of said set at least one command message via said second communications link, directly between said at least one piece of data-gathering equipment of said set and said piece of equipment of said set that is to be controlled by the at least one command message, said at least one command message being determined by the at least one piece of data-gathering equipment as a function of data received by this data-gathering equipment to control the functional adjustments of the corresponding domestic appliance, said at least one command message being sent after reception of said alert message by said piece of data-gathering equipment.

9. The device according to claim 8, wherein the device further comprises:
the data-gathering equipment, which transmits at least one result of measurements to the management module via the corresponding at least one respective first communications link.

10. A device for providing a minimum service in a system comprising a management module and a set of pieces of equipment, including the device, connected to the management module via respective first communications links, said set including at least one piece of equipment that is to be controlled and at least one piece of data-gathering equipment, each piece of equipment of the set that is to be controlled comprising a domestic appliance having an actuator performing functional adjustments of the domestic appliance, said at least one piece of data-gathering equipment of the set being configured for transmitting data to said management module via the corresponding at least one respective first communications link, the device comprising:
a non-transitory computer-readable medium comprising instructions stored thereon; and
a processor configured by the instructions to perform acts comprising:
receiving an alert message, the alert message indicating an absence of signaling activity from said management module, and the alert message triggering the minimum service, wherein the minimum service corresponds to a service in which the pieces of equipment of said set communicate directly with one another via a second communications link instead of via the respective first communication link used to communicate with the management module; and
transmitting at least one command message for at least one piece of equipment of the set that is to be controlled via said second communications link, directly between said device and said piece of equipment of said set that is to be controlled by the at least one command message, after receiving the alert message, said at least one command message being determined by a piece of data-gathering equipment of the set as a function of data received by this data-gathering equipment to control the functional adjustments of the corresponding domestic appliance, wherein the at least one command message is transmitted after the processor receives data indicative of said received data.

11. The device according to claim 10, wherein the processor further activates said second communications link with said at least one piece of equipment of the set that is to be controlled.

12. The device according to claim 10, wherein the device further comprises:
the data-gathering equipment, which transmits at least one result of measurements to the management module via the corresponding at least one respective first communications link.

13. Equipment that is to be controlled, the equipment comprising a domestic appliance and being a member of a set of pieces of equipment connected to a management module via respective first communications links, said set including the equipment that is to be controlled and at least one piece of data-gathering equipment, wherein the equipment to be controlled comprises:

a non-transitory computer-readable medium comprising instructions stored thereon; and
a processor configured by the instructions to perform acts comprising:
receiving at least one control command coming from the management module via the respective first communications link;
receiving, by a piece of equipment of the set, an alert message, the alert message indicating an absence of signaling activity from said management module and the alert message triggering a minimum service in which the pieces of equipment of said set communicate directly with one another via a second communications link instead of via the respective first communications links used to communicate with the management module;
receiving at least one command message coming from a piece of data-gathering equipment of the set via said second communications link, directly between said piece of data-gathering equipment of said set and said equipment that is to be controlled by the at least one command message, after receiving the alert message, said at least one command message being determined by the piece of data-gathering equipment as a function of data received from this data-gathering equipment to control functional adjustments of the equipment to be controlled; and
an actuator, which is controlled by the at least one command message to perform the functional adjustment of the equipment to be controlled.

14. A system comprising:
a management module;
a set of pieces of equipment connected to the management module via respective first communications links, said set comprising at least one piece of equipment that is to be controlled and at least one piece of data-gathering equipment, each piece of equipment of the set that is to be controlled comprising a domestic appliance having an actuator configured to perform functional adjustments of the domestic appliance, said management module being configured to determine at least one control command as a function of data received from at least one piece of data-gathering equipment of the set and to transmit said at least one control command that has been determined to at least one piece of equipment of the set that is to be controlled;
at least one detection device comprising:
a non-transitory computer-readable medium comprising instructions stored thereon; and
a processor configured by the instructions to perform acts comprising:
monitoring application signaling activity from the management module via the respective first communications link;
detecting an absence of the application signaling activity over a predetermined time period, monitored during the act of monitoring; and
triggering a minimum service by transmitting an alert message to at least one piece of equipment of the set in the event of detecting the absence of the application signaling activity, wherein the minimum service corresponds to a service in which the pieces of equipment of said set communicate directly with one another via a second communications link instead of via the respective first communication links used to communicate with the management module, and wherein a piece of equipment of the set that is to be controlled of said set receives from the at least one piece of data-gathering equipment of the set at least one command message via said second communications link, directly between said at least one piece of data-gathering equipment of said set and said piece of equipment of said set that is to be controlled by the at least one command message, said at least one command message being determined by said at least one piece of data-gathering equipment of said set as a function of data received by this data-gathering equipment to control the functional adjustments of the corresponding domestic appliance, said at least command message being sent after reception of said alert message by said piece of data-gathering equipment; and at least one device for providing the minimum service, the device comprising:
 a non-transitory computer-readable medium comprising further instructions stored thereon; and
 a processor configured by the further instructions to perform acts comprising:
 receiving the alert message; and
 transmitting or receiving, by said piece of equipment of the set, the at least one command message for the at least one piece of equipment that is to be controlled by the at least one command message via the second communications link, after receiving the alert message.

15. A non-transitory computer-readable storage device comprising a computer program stored thereon and including instructions for implementing a method of managing a system when loaded and executed by a processor, the system comprising a management module and a set of pieces of equipment connected to the management module via respective first communications links, said set comprising at least one piece of equipment that is to be controlled and at least one piece of data-gathering equipment, each piece of equipment of the set that is to be controlled comprising a domestic appliance having an actuator configured to perform functional adjustments of the domestic appliance, said management module being configured for determining at least one control command as a function of data received from at least one piece of data-gathering equipment of the set via the corresponding at least one respective first communications link and for transmitting said at least one control command that has been determined to at least one piece of equipment of the set that is to be controlled by the at least one control command; wherein the instructions comprise:
 instructions that configure the processor to monitor application signaling activity from said management module via the respective first communications link;
 instructions that configure the processor to detect an absence of the application signaling activity over a predetermined time period, from monitoring the application signaling activity; and
 instructions that configure the processor to trigger a minimum service by sending an alert message to at least one piece of equipment of the set in the event of detecting the absence of the application signaling activity for the predetermined time period, wherein the minimum service corresponds to a service in which the pieces of equipment of said set communicate directly with one another via a second communications link instead of via the respective first communication links used to communicate with the management module, and wherein the piece of equipment of the set that is to be controlled receives from the at least one piece of data-gathering equipment of said set at least one command message via said second communications link, directly between said at least one piece of data-gathering equipment of said set and said piece of equipment of said set that is to be controlled by the at least one command message, said at least one command message being determined by said at least one piece of data-gathering equipment of said set as a function of data received by this data-gathering equipment to control the functional adjustments of the corresponding domestic appliance, said at least one command message being sent after reception of said alert message by said piece of data-gathering equipment.

16. A non-transitory computer-readable storage device comprising a computer program product stored thereon and including instructions for implementing a method for providing a minimum service in a system when loaded and executed by a processor, the system comprising a management module and a set of pieces of equipment connected to the management module via respective first communications links, said set including at least one piece of equipment that is to be controlled and at least one piece of data-gathering equipment, each piece of equipment of the set that is to be controlled comprising a domestic appliance having an actuator configured to perform functional adjustments of the domestic appliance, said at least one piece of data-gathering equipment of the set being configured for transmitting data to said management module via the corresponding at least one respective first communications link, wherein the instructions comprise:
 instructions that configure the processor of a piece of equipment of the set to receive an alert message that triggers the minimum service, wherein the minimum service corresponds to a service in which the pieces of equipment of said set communicate directly with one another via a second communications link instead of via the respective first communication links used to communicate with the management module; and
 instructions that configure the processor of the piece of equipment of the set to, after receiving the alert message, transmit or receive at least one command message for the at least one piece of equipment of the set that is to be controlled via said second communications link, directly between said piece of equipment of said set and said at least one piece of equipment of said set that is to be controlled by the at least one command message, wherein said at least one command message is determined by a piece of data-gathering equipment of the set as a function of data received by this data-gathering equipment to control the functional adjustments of the corresponding domestic appliance.

17. Data-gathering equipment, wherein the data-gathering equipment is a member of a set of pieces of equipment connected to a management module via respective first communications links, said set including the data-gathering equipment and at least one equipment that is to be controlled, each piece of equipment of the set that is to be controlled comprising a domestic appliance having an actuator configured to perform functional adjustments of the domestic appliance, wherein the data-gathering equipment comprises:
 a non-transitory computer-readable medium comprising instructions stored thereon; and
 a processor configured by the instructions to perform acts comprising:
 transmitting data to the management module via the respective first communications link;

receiving an alert message, the alert message indicating an absence of signaling activity from said management module, and the alert message triggering a minimum service in which the pieces of equipment of said set communicate directly with one another via a second communications link instead of via the respective first communication links used to communicate with the management module; and transmitting at least one command message to the at least one equipment to be controlled of the set via said second communications link, directly between the data-gathering equipment and said at least one equipment to be controlled by the at least one command message, after receiving the alert message, said at least one command message being determined said data-gathering equipment as a function of data received from this data-gathering equipment to control the functional adjustments of the domestic appliance.

* * * * *